(12) United States Patent
Griswold et al.

(10) Patent No.: US 11,067,184 B2
(45) Date of Patent: Jul. 20, 2021

(54) TRIPLE ICEMAKER VALVE WITH MULTIPLE CONFIGURATIONS

(71) Applicants: Jay P. Griswold, Saint Charles, IL (US); Todd D. Tiefenbach, Bolingbrook, IL (US)

(72) Inventors: Jay P. Griswold, Saint Charles, IL (US); Todd D. Tiefenbach, Bolingbrook, IL (US)

(73) Assignee: Robertshaw Controls Company, Itasca, IL (US)

( * ) Notice: Subject to any disclaimer, the term of this patent is extended or adjusted under 35 U.S.C. 154(b) by 544 days.

(21) Appl. No.: 15/613,910

(22) Filed: Jun. 5, 2017

(65) Prior Publication Data

US 2018/0347714 A1    Dec. 6, 2018

(51) Int. Cl.
*F16K 11/22*     (2006.01)
*F16K 27/02*     (2006.01)
(Continued)

(52) U.S. Cl.
CPC .............. *F16K 11/22* (2013.01); *F16K 11/24* (2013.01); *F16K 27/003* (2013.01);
(Continued)

(58) Field of Classification Search
CPC ........ F16K 11/22; F16K 11/24; F16K 27/003; F16K 27/0263; B67D 1/1277;
(Continued)

(56) References Cited

U.S. PATENT DOCUMENTS 3,516,638 A    6/1970  Piggott
3,556,147 A *  1/1971  Sizer ....................... F15B 13/04
                                                137/614.11
(Continued)

FOREIGN PATENT DOCUMENTS

CN        1862188 A    11/2006

OTHER PUBLICATIONS

General Electric; Valve Tri Water; Drawing number and filename 239D2I44P001; 2 pages; Known prior to Jun. 5, 2017.
(Continued)

*Primary Examiner* — Mary E. McManmon
(74) *Attorney, Agent, or Firm* — Reinhart Boerner Van Deuren P.C.

(57) ABSTRACT

Provided herein are embodiments of a refrigerator valve and method of routing water through a refrigerator with the valve. The valve includes three valve bodies that route water in a refrigerator to different features. The middle valve body is higher than the two outer valve bodies, allowing the solenoid actuators to be mounted in a space-saving manner. The three valve bodies are linked by a central core pin that can be continuous or discontinuous such that the central core pin can provide fluid communication between all three valve bodies or divide the valve into two separate but linked valves. In a valve with a discontinuous central core pin, one valve body is isolated from the other two valve bodies so as to provide a redundant shutoff and allow a filter of a filtration unit to be replaced without having to shut off the water being supplied to the refrigerator.

9 Claims, 8 Drawing Sheets (51) Int. Cl.
  *F16K 11/24*  (2006.01)
  *F16K 27/00*  (2006.01)
  *B67D 1/12*  (2006.01)
  *B67D 1/00*  (2006.01)

(52) U.S. Cl.
  CPC ........ *F16K 27/0263* (2013.01); *B67D 1/1277* (2013.01); *B67D 2001/0093* (2013.01); *F25C 2400/14* (2013.01)

(58) Field of Classification Search
  CPC ......... B67D 2001/0093; F25C 2400/14; Y10T 137/87877
  See application file for complete search history.

(56) References Cited

U.S. PATENT DOCUMENTS

| | | | | |
|---|---|---|---|---|
| 3,788,344 | A | * | 1/1974 | Dyck .................... F16K 27/003 137/271 |
| 4,782,852 | A | * | 11/1988 | Legris ................... F16L 37/252 137/269 |
| 6,035,893 | A | | 3/2000 | Ohmi et al. |
| 2014/0109973 | A1 | | 4/2014 | Neumeister et al. |
| 2015/0267299 | A1 | | 9/2015 | Hawkins et al. |

OTHER PUBLICATIONS

Useong Electro Mechanics Co, Ltd; Valve; 1 page; known prior to Jun. 5, 2017.

* cited by examiner

TRIPLE ICEMAKER VALVE WITH MULTIPLE CONFIGURATIONS

FIELD OF THE INVENTION

This invention generally relates to a valve, and more particularly, this invention relates to a valve capable of routing water in a refrigerator.

BACKGROUND OF THE INVENTION

Commercially available refrigerators frequently include convenience features, like water dispensers, ice makers, pitcher fillers, etc., that require the routing of water within the refrigerator unit. Additionally, for safety and flood prevention, these refrigerators utilize an isolation valve to act as a redundant shut off feature at the point where the residential water supply is connected to the refrigerator. At the same time, refrigerator manufacturers have attempted to reduce the profile of the water routing units so as to increase the available interior space for additional storage.

Conventional refrigerators use single valves to act as the isolation valve and dual valves to route the water to, e.g., the icemaker and the water dispenser. However, when a refrigerator manufacturer desires to add an additional feature, such as an interior pitcher filler or a second icemaker, they must add additional single or dual valves, depending on the number of additional ports that are needed. However, routing water to these additional valves requires the use of T-fittings into the water supply line, which increase expense and take up additional space that is preferably used for interior storage.

Accordingly, a need exists in the art for a valve that provides multiple configurations to supply water to refrigerator features while also increasing the amount of usable storage space. Embodiments disclosed herein provide such a valve as well as a method of routing water in a refrigerator. These and other advantages of the invention, as well as additional inventive features, will be apparent from the description of the invention provided herein.

BRIEF SUMMARY OF THE INVENTION

Provided herein are embodiments of a configurable valve. The valve includes three valve bodies that are capable of routing water in a refrigerator to different features, such as one or more icemakers, a water dispenser, and/or a pitcher filler. Advantageously, the middle valve body is higher than the two outer valve bodies, which allows for the solenoid actuators to be mounted in a space-saving manner as will be described more fully below. Additionally, the three valve bodies are linked by a central core pin that can be either continuous or discontinuous. That is, the central core pin can provide fluid communication between all three valve bodies, or it can divide the valve into two separate yet mechanically linked valves. In a valve with a discontinuous central core pin, one valve body is isolated from the other two valve bodies. In this way, unfiltered water supplied to the refrigerator can be routed to a filtration unit, and from the filtration unit, filtered water can be routed to the other two valve bodies for dispensing. Beneficially, isolating one valve body provides a redundant shutoff and allows the filter of the filtration unit to be replaced without having to shut off the water being supplied to the refrigerator.

Further, the valve bodies and the central core pin have modifiable openings such that the openings can be configured as inlets or outlets or be capped. Accordingly, the way in which water flows through the valve is customizable for different refrigerator configurations. In this regard, provided herein are also embodiments of a method for routing water through a refrigerator using embodiments of the disclosed valve.

Having generally discussed the valve, its method of operation, and its advantages, specific embodiments of the valve and method of use are described in the following paragraphs. In one aspect, embodiments of a triple valve are provided. The triple valve includes a first valve body having a first end and a second end, a second valve body having a first end and a second end, and a third valve body having a first end and a second end. A central core pin mechanically connects the first valve body, the second valve body, and the third valve body. Further, the second valve body is disposed between the first valve body and the third valve body, and the second valve body extends beyond a plane defined by the first end of the first valve body or by the first end of the third valve body.

In an embodiment of the triple valve, the central core pin defines a continuous interior channel that is in fluid communication with the first valve body, the second valve body, and the third valve body. In certain embodiments, each of the first valve body, the second valve body, and the third valve body include a port at the second end, a central bore in fluid communication with the port, and a passage disposed exterior to the central bore. The passage is in fluid communication with the continuous interior channel and with the central bore. Additionally, in an embodiment, each of the first ends of the first valve body, the second valve body, and the third valve body has a solenoid mounted thereon such that actuation of each respective solenoid permits or prevents fluid communication between the respective central bores and the respective passages of the first valve body, the second valve body, and the third valve body. In further embodiments, a first end of continuous interior channel is configured to received fluid from a fluid supply and fluid entering the first end of the continuous interior channel is distributed through one or more of the first valve body, the second valve body, or the third valve body via actuation of the respective solenoid of the first valve body, the second valve body, or the third valve body.

In another embodiment of the triple valve, the central core pin includes a core split such that the central core pin defines a first interior channel and a second interior channel. The core split prevents fluid flow from the first interior channel to the second interior channel. The first interior channel is in fluid communication with the first valve body and the second valve body, and the second interior channel is in fluid communication with the third valve body. In certain embodiments, each of the first valve body, the second valve body, and the third valve body include a port at the second end, a central bore in fluid communication with the port, and a passage disposed exterior to the central bore. The respective passage of the first valve body and the second valve body are in fluid communication with the respective central bore of the first valve body and the second valve body and with the first interior channel and the passage of the third valve body is in fluid communication with the second interior channel and with the central bore of the third valve body. Additionally, in embodiments, each of the first ends of the first valve body, the second valve body, and the third valve body has a solenoid mounted thereon such that actuation of each respective solenoid permits or prevents fluid communication between the respective central bore and the respective passage of the first valve body, the second valve body, and the third valve body. In further embodiments, the second interior channel is configured to receive unfiltered water from a water supply, and the third valve body is configured to distribute the unfiltered water to a filtration unit via actuation of the solenoid mounted to the third valve body. Additionally, the first interior channel is configured to receive filtered water from the filtration unit, and each of the first valve body and the second valve body is configured to distribute the filtered water via actuation of the respective solenoid of the first valve body or the second valve body.

In other embodiments having the first and second interior channels, a first solenoid is mounted to the first end of the third valve body, and a second solenoid is mounted to one of the first ends of the first valve body or the second valve body. The other first end of the first valve body or the second valve body is capped. Actuation of the first solenoid permits or prevents fluid communication between the central bore and the passage of the third valve body, and actuation of the second solenoid permits or prevents fluid communication between the central bore and the passage of whichever of the first valve body or the second valve body upon which the second solenoid is mounted. In certain embodiments, the second interior channel is configured to receive unfiltered water from a water supply, and the third valve body is configured to distribute the unfiltered water to a filtration unit via actuation of the first solenoid mounted to the third valve body. The port of either the first valve body or the second valve body is configured to receive filtered water from the filtration unit, and the other port of the first valve body or the second valve body is configured to distribute the filtered water via actuation of the second solenoid.

In still another embodiment of the triple valve, the first valve body, the second valve body, and the third valve body are arranged substantially along a straight line. Further, at least two of the first valve body, the second valve body, or the third valve body has a solenoid mounted thereon, and each solenoid has one or more connection prongs that are oriented substantially parallel to the straight line. In a particular embodiment, each of the first valve body, the second valve body, and the third valve body has a solenoid mounted thereon, and two of the solenoids are oriented in a first direction while the third solenoid is oriented in a second direction that is 180° from the first direction.

In another aspect, embodiments of a method of routing water within a refrigerator with a triple valve are provided. The triple valve includes a first valve body having a first solenoid, a second valve body having a second solenoid, and a third valve body having a third solenoid. The triple valve also includes a central core pin defining a continuous interior channel in fluid communication with the first valve body, the second valve body, and the third valve body. The method includes the steps of supplying water to a first end of the central core pin, actuating at least one of the first solenoid, the second solenoid, or the third solenoid, and distributing water to a feature of the refrigerator through the respective first valve body, second valve body, or third valve body of the actuated first solenoid, second solenoid, or third solenoid.

In embodiments, the step of distributing water to a feature further includes distributing water to at least one of an icemaker, a water dispenser, or a pitcher filler. In other embodiments, the step of distributing water to a feature further includes distributing water to an icemaker through the first valve body upon actuating the first solenoid valve and distributing water to a water dispenser through the second valve body upon actuating the second solenoid valve.

In still another aspect, embodiments of a method of routing water within a refrigerator with a triple valve are provided. The triple valve includes a first valve body having a first solenoid, a second valve body having a second solenoid, a third valve body. The triple valve also includes a central core pin defining a first interior channel in fluid communication with the first valve body and the third valve body and also defining a second interior channel in fluid communication with the second valve body. The method includes the steps of supplying unfiltered water to an inlet of the second interior channel on a first side of the central core pin and actuating the second solenoid. The method also includes the steps of distributing the unfiltered water to a filtration unit through the second valve body, such that the unfiltered water becomes filtered water after traveling through the filtration unit, and supplying the filtered water to the first interior channel.

In embodiments, the third valve body is capped at a first end, and the step of supplying the filtered water to the first interior channel further includes supplying the filtered water to a port on a second end of the third valve body. In a particular embodiment, the method further includes the steps of actuating the first solenoid and distributing the filtered water to a feature of the refrigerator through the first valve body.

In another embodiment of the method, the third valve body has a third solenoid. In such an embodiment, the step of supplying the filtered water to the first interior channel further involves supplying the filtered water to an inlet on a second side of the central core pin. The method includes the additional steps of actuating the first solenoid or the third solenoid and distributing the filtered water to a feature of the refrigerator through the respective first valve body or third valve body of the actuated first solenoid or third solenoid.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Various embodiments of a triple valve are disclosed herein. The triple valve provides enhanced configurability such that the triple valve can be deployed in a variety of different applications. In particular, the triple valve is well-suited for use in a refrigerator that includes such features as, e.g., a water filter, one or more icemakers, a water dispenser, a pitcher filler, etc. For example, in an embodiment, the triple valve routes water to three different refrigerator features, such as an icemaker, a dispenser, and a pitcher filler. In another embodiment, the triple valve provides an isolation valve and a dual valve in which the isolation valve routes unfiltered water to a water filter and the dual valve routes filtered water to an icemaker and a water dispenser, for example. Advantageously, the isolation valve also operates as a redundant shutoff valve to help prevent water leakage from the features controlled by the dual valve. These and other embodiments and advantages will be discussed in more detail below. Further, while the triple valve is discussed in the context of a refrigerator, the embodiments of the triple valve lend themselves to other contexts and applications as will be understood by a person of ordinary skill in the art from the present disclosure. That is, all embodiments discussed herein are presented by way of example only and not by way of limitation.

Figure 1:
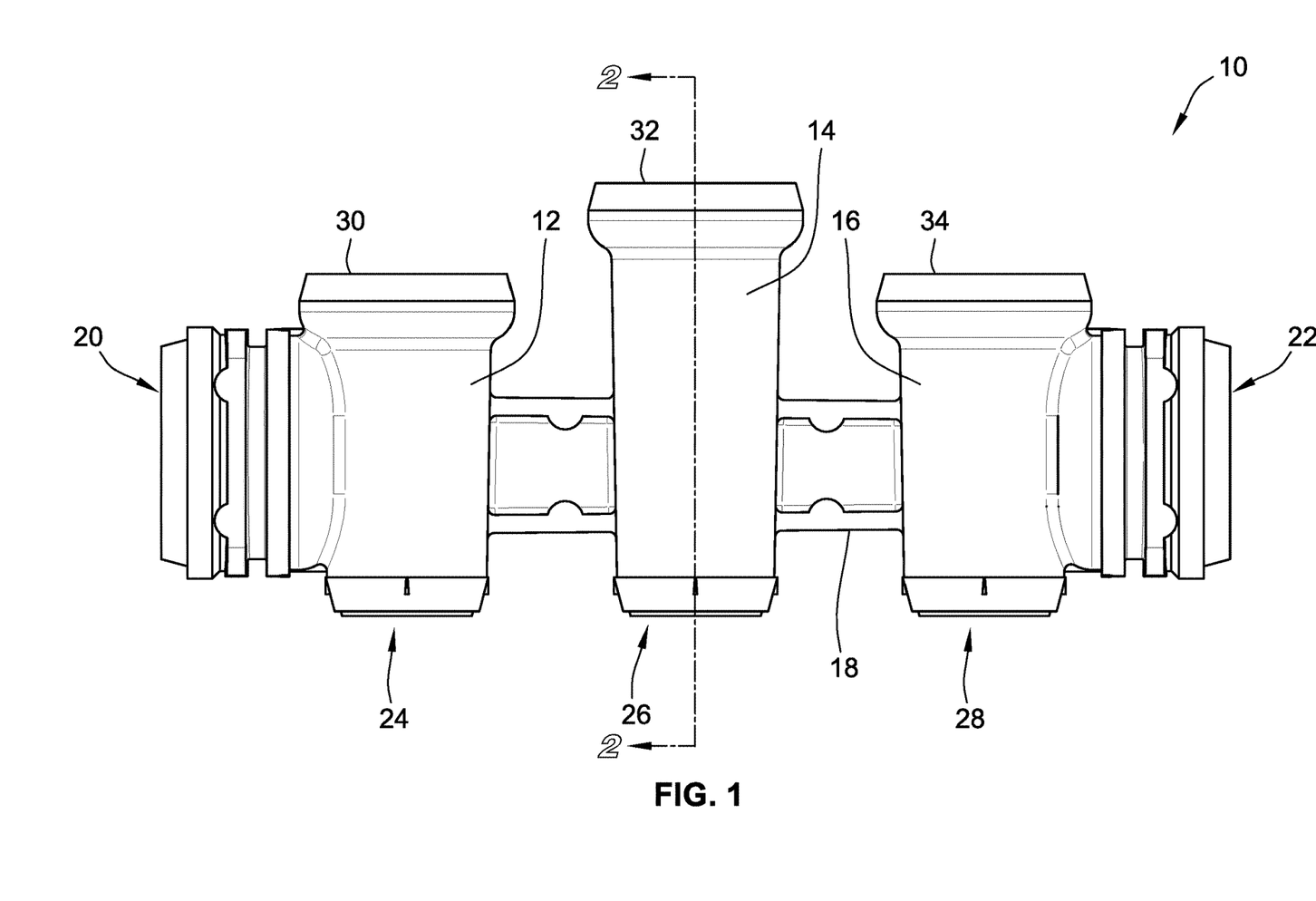
FIG. 1 depicts a triple valve, according to an exemplary embodiment.

A triple valve 10 is depicted in FIG. 1. The triple valve 10 includes a first valve body 12, a second valve body 14, and a third valve body 16. A central core pin 18 mechanically and at least partially fluidly connects the first valve body 12, the second valve body 14, and the third valve body 16. The central core pin 18 has a first end 20 and a second end 22, and in embodiments, the first end 20 and the second end 22 are inlets and/or outlets of the central core pin 18. As also shown in FIG. 1, the first valve body 12, the second valve body 14, and the third valve body 16 have a first port 24, a second port 26, and a third port 28, respectively, which as will be discussed more fully below are fitted with fixtures that enable the triple valve 10 to receive or distribute water. Further, the first valve body 12, the second valve body 14, and the third valve body 16 have a first mount 30, a second mount 32, and a third mount 34, respectively, which, as will be discussed more fully below, are fitted with such fixtures as a solenoid or a cap to facilitate routing of water within the triple valve 10.

Figure 2:
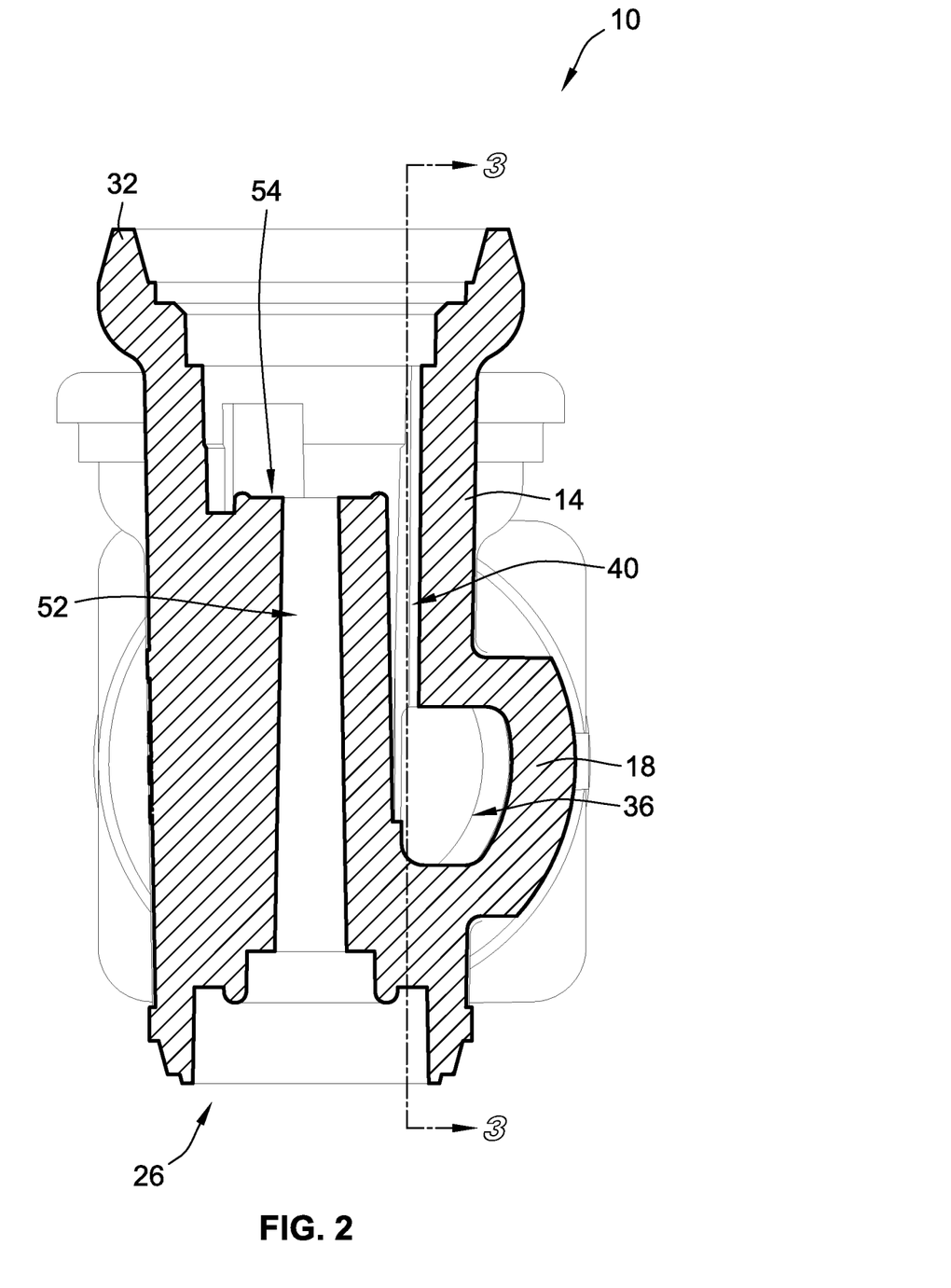
FIG. 2 depicts a cross-section of a valve body of a triple valve taken along line 2-2 of FIG. 1, according to an exemplary embodiment.

FIG. 2 depicts a cross-sectional view of the second valve body 14 of the triple valve 10. As can be seen, the interior of surface of the central core pin 18 defines a channel 36 that is in fluid communication with a second passage 40 of the second valve body 14. Additionally, the second valve body 14 includes a central bore 52 that provides fluid communication between the second port 26 and the channel 36 via the second passage 40. The first valve body and the third valve body also include a respective passage and central bore, as will be discussed below. Depending on the particular arrangement of the triple valve 10, fluid can flow either direction through the central bore 52, i.e., from the second port 26 to the channel 36 or from the channel 36 to the second port 26. Disposed at one end of the central bore 52 (the end opposite the second port 26) is a seating surface 54, which, as will become more apparent below, can be configured to seat a valve plug, e.g., of a solenoid valve, to close off flow through the central bore 52.

Figure 3:
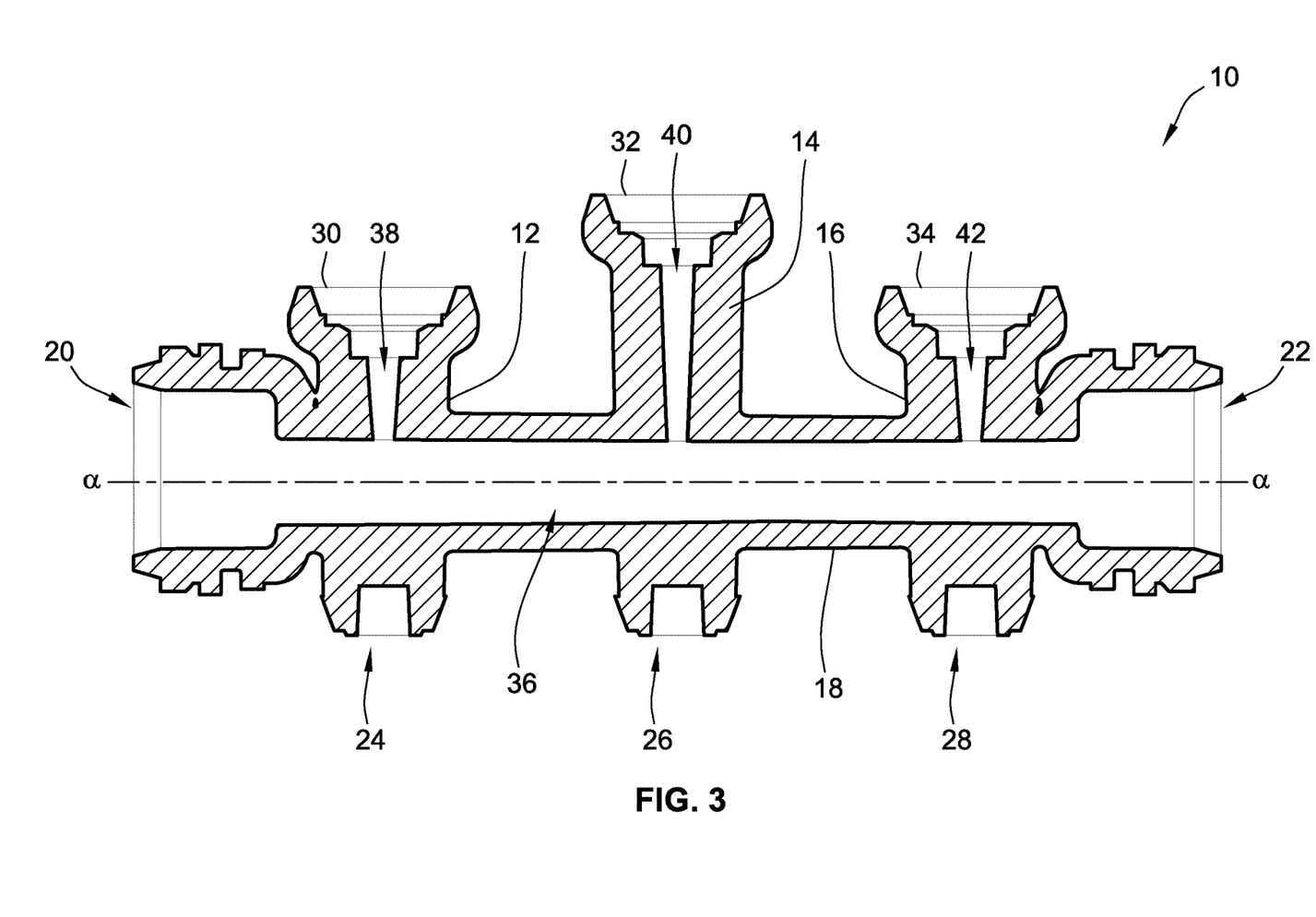
FIG. 3 depicts a cross-section of a triple valve having a continuous channel taken along line 3-3 of FIG. 2, according to an exemplary embodiment.

FIG. 3 provides a cross-sectional view of the triple valve 10 taken along the plane defined by line 3-3 of FIG. 2. That is, FIG. 3 demonstrates the fluid communication between each of the first valve body 12, the second valve body 14, and the third valve body 16 provided by the channel 36 in the central core pin 18. In that regard, the channel 36 extends along axis a between the first end 20 and the second end 22 of the triple valve 10 to provide fluid communication with the first valve body 12, the second valve body 14, and the third valve body 16. Thus, in the embodiment depicted in FIG. 3, the first valve body 12, the second valve body 14, and the third valve body 16 are all in fluid communication with each other via the channel 36. As mentioned above, the second valve body 14 includes second passage 40 that provides fluid communication between the channel 36 and the interior of the second valve body 14. Similarly, the first valve body 12 includes a first passage 38 that provides fluid communication between the channel 36 and the interior of the first valve body 12, and the third valve body 16 includes a third passage 42 that provides fluid communication between the channel 36 and the interior of the third valve body 16. In an exemplary embodiment, the triple valve 10 operates to provide water distribution via all three valve bodies 12, 14, 16, such as to an icemaker, a water dispenser, and a second icemaker or pitcher filler. Generally, water supplied to this triple valve 10 configuration will be filtered water that has already traveled through a home water filter or a water filtration unit in the refrigerator.

Figure 4:
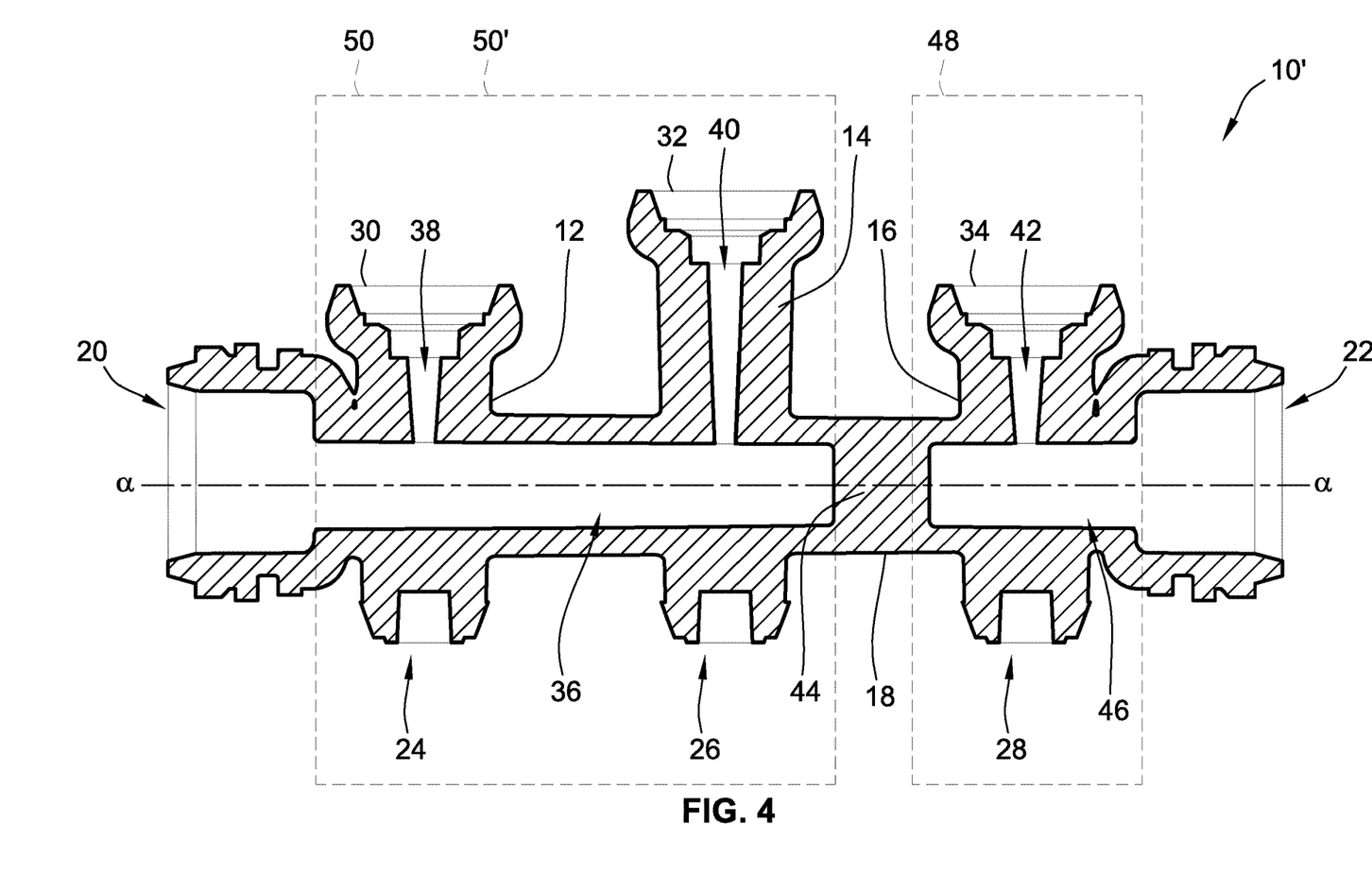
FIG. 4 depicts a cross-section of a triple valve having a discontinuous channel, according to an exemplary embodiment.

As compared to FIG. 3 in which the channel 36 is continuous from the first end 20 to the second end 22, a second configuration of the triple valve 10' includes a discontinuous channel as shown in FIG. 4. In the embodiment of FIG. 4, the triple valve 10' includes a core split 44. The core split 44 prevents fluid from flowing from the first end 20 to the second end 22 of the triple valve 10'. In this way, the central core pin 18 is divided into channel 36 and second channel 46. The channel 36 is in fluid communication with the first end 20, the first valve body 12, and the second valve body 14, while the second channel 46 is in fluid communication with the second end 22 and the third valve body 16. In an exemplary embodiment, the third valve body 16 is used as an isolation valve 48. In the context of a refrigerator, the isolation valve 48 receives water from a residential water supply and routes that water to a filtration unit contained in the refrigerator. Further, in this context, the first valve body 12 and the second valve body 14 are a dual valve 50 that, e.g., route filtered water from the refrigerator's filtration unit to an icemaker and a water dispenser. Alternatively, in embodiments, the first valve body 12 and the second valve body 14 operate together a single valve 50' by using one of the port 24, 26 of the first valve body 12 or the second valve body 14 as an inlet of the single valve 50'. In this way, the first valve body 12 or the second valve body 14 is a conduit to transport water to the other of the first valve body 12 or the second valve body 14.

As shown in FIGS. 1, 3, and 4, the primary difference between the first valve body 12, the second valve body 14, and the third valve body 16 is that the second valve body 14 extends beyond the plane defined by the first mount 30 of the first valve body 12 and the third mount 34 of the third valve body 16. The benefit of the additional height of the second valve body 14 as it pertains to the installation of a solenoid will be discussed more fully below. However, the first valve body 12, the second valve body 14, and the third valve body 16 have generally the same internal structure, which is depicted in FIG. 2. In an alternative embodiment, two of the valve bodies can be taller than the third valve body if the two taller valve bodies are arranged in a side-by-side fashion. As will be discussed below, this configuration will also provide the same space-saving advantage with respect to orientation of the solenoids on the valve bodies as the embodiment in which the middle valve body is taller than the two outer valve bodies.

Figure 5:
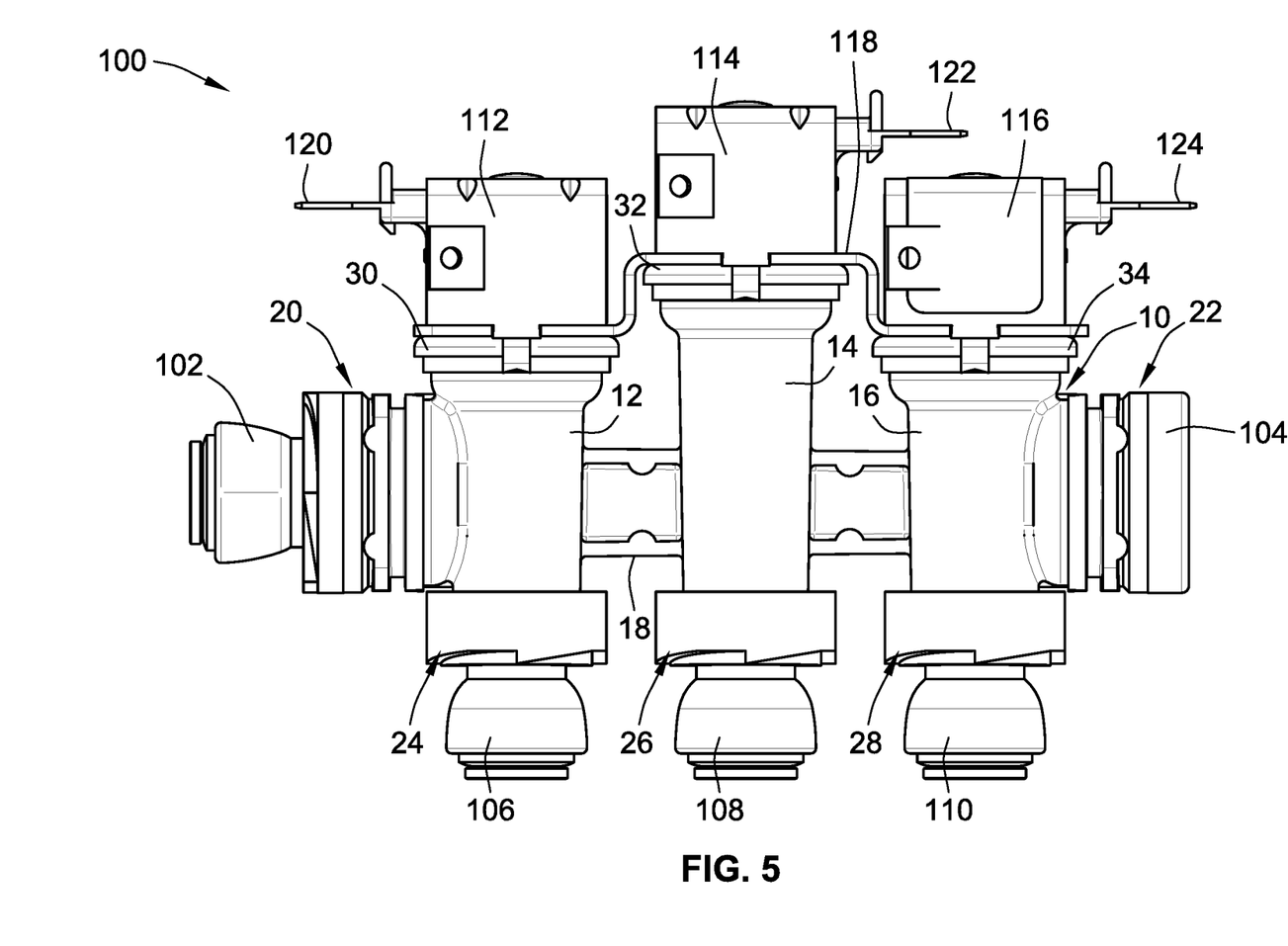
FIG. 5 depicts a first configuration of a triple valve having a continuous channel, according to an exemplary embodiment.

The triple valve 10, 10' can be used in a variety of different configurations. FIG. 5 depicts a first configuration 100 using the triple valve 10. In FIG. 5, the first end 20 operates as an inlet of the triple valve 10 and is fitted with a straight connector 102. The second end 22 of the triple valve 10 is plugged with a cap 104. Further, the first port 24, the second port 26, and the third port 28 all operate as outlets of the triple valve 10, and the first port 24, the second port 26, and the third port 28 are all fitted straight connectors 106, 108, 110. While straight connectors 102, 106, 108, 110 are depicted, other connectors are used in different embodiments, as will be shown below. Notwithstanding, the type of connector used will largely depend on the space available for the connection, the placement of the triple valve 10, 10' in the refrigerator, the connection type, etc. Thus, the portrayal of straight connections is this embodiment is not intended as limiting this embodiment to the use of straight connectors.

Additionally, a first solenoid 112 is provided on the first mount 30 of the first valve body 12, a second solenoid 114 is provided on the second mount 32 of the second valve body 14, and a third solenoid 116 is provided on the third mount 34 of the third valve body 16. In an embodiment, the solenoids 112, 114, 116 are supported on a bracket 118. The first solenoid 112 includes a first set of connection prongs 120, the second solenoid 114 includes a second set of connection prongs 122, and the third solenoid 116 includes a third set of connection prongs 124. The connection prongs 120, 122, 124 receive an electrical signal to actuate the solenoids 112, 114, 116 such that fluid is allowed or prevented from flowing through the three valve bodies 12, 14, 16. That is, the solenoids 112, 114, 116 include valve plugs (not shown) that engage or disengage the valve seat 54 (as shown in FIG. 4) to control flow of fluid through the valve bodies 12, 14, 16. Generally, in most embodiments, the solenoids 112, 114, 116 operate independently from each other such that fluid can be independently routed through the first valve body 12, the second valve body 14, or the third valve body 16.

As mentioned above, the second valve body 14 extends beyond the plane defined by the first mount 30 of the first valve body 12 and the third mount 34 of the third valve body 16. As such, the second mount 32 is higher than the first mount 30 and the third mount 34. Accordingly, the second solenoid 114 is higher than the first solenoid 112 and the third solenoid 116. In particular, this allows the solenoids 112, 114, 116 to be oriented with their connection prongs 120, 122, 124 toward the first end 20 or the second end 22 of the triple valve 10. In this way, the electrical connections to the connection prongs 120, 122, 124 are made in the plane defined by the width of the triple valve 10. Advantageously, this decreases the thickness of the triple valve 10 installation in a refrigerator, allowing for more interior storage space. This advantage is available in every embodiment of the triple valve 10, 10' provided herein. Notwithstanding the advantage provided by orienting the solenoids 112, 114, 116 in a sideways manner, the triple valve 10, 10' is not limited to this configuration as the mounts 30, 32, 34 allow for the orientation of the solenoids 112, 114, 116 in any direction. Additionally and as mentioned above, if two side-by-side valve bodies are taller than a third valve body, then the solenoids can still be oriented in the space-saving fashion, i.e., with the connection prongs oriented to the first or second end of the triple valve.

Figure 6:
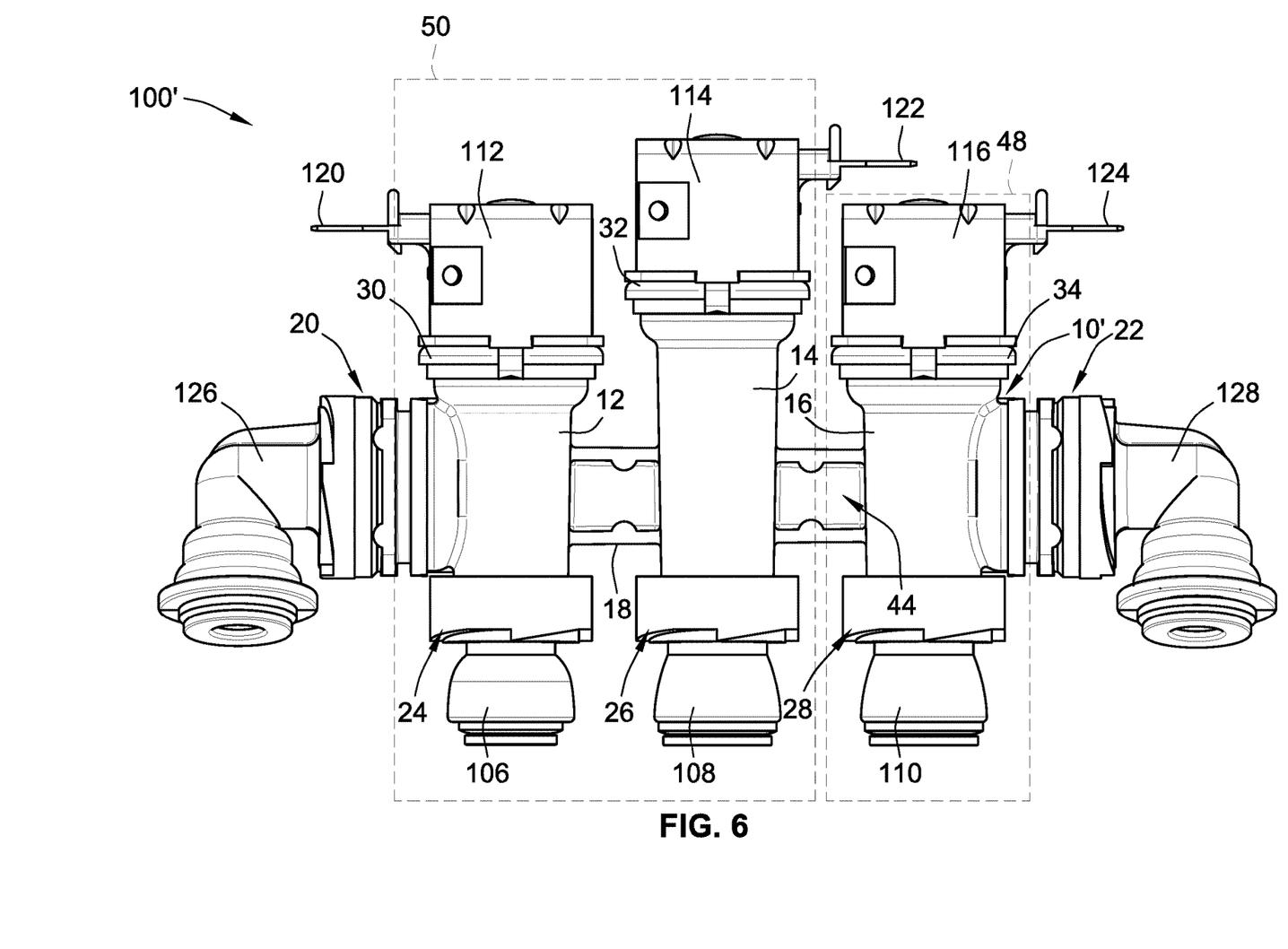
FIG. 6 depicts a second configuration of a triple valve having a discontinuous channel, according to an exemplary embodiment.

FIG. 6 provides a second configuration 100' of the triple valve 10' having a core split 44. In this configuration 100', the third valve body 16 operates as an isolation valve 48, while the first valve body 12 and the second valve body 14 operate as a dual valve 50. As depicted in the embodiment of FIG. 6, the first end 20 of the triple valve 10' is fitted with a right angle connector 126, and the second end 22 of the triple valve 10' is also fitted with a right angle connector 126. These connectors are depicted for the purpose of illustration, and other connectors could be used at the first end 20 and the second end 22 of this configuration 100', including the connectors depicted in the other figures and embodiments.

In an exemplary embodiment, the second end 22 of the triple valve 10' receives unfiltered water from a residential water line. The third solenoid 116 is actuated to distribute water through the third valve body 16 and out through the straight connector 110 to a water filtration unit located in the refrigerator. The filtration unit then outputs the filtered water into the first end 20 of the triple valve 10'. The first end 20 is in fluid communication with the first valve body 12 and the second valve body 14, which distribute the filtered water, e.g., to an icemaker and a water dispenser, via actuation of the first solenoid 112 and the second solenoid 114.

Advantageously, the third valve body 16 in the second configuration 100' operates as an isolation valve 48 between the unfiltered water and filtered water. In this way, the isolation valve 48 also operates as a redundant shutoff valve. This allows for replacement of a filter cartridge in the filtration unit without requiring the shutoff of water going to the refrigerator. Further, in embodiments, if the water controller detects that water is leaking in one of the refrigerator features, the isolation valve 48 is closed to prevent additional water from the residential water lines from flowing through the filtration unit and into the dual valve 50 portion of the triple valve 10'. Accordingly, the triple valve 10' in the second configuration 100' enhances protection against leakage from the refrigerator.

Figure 7:
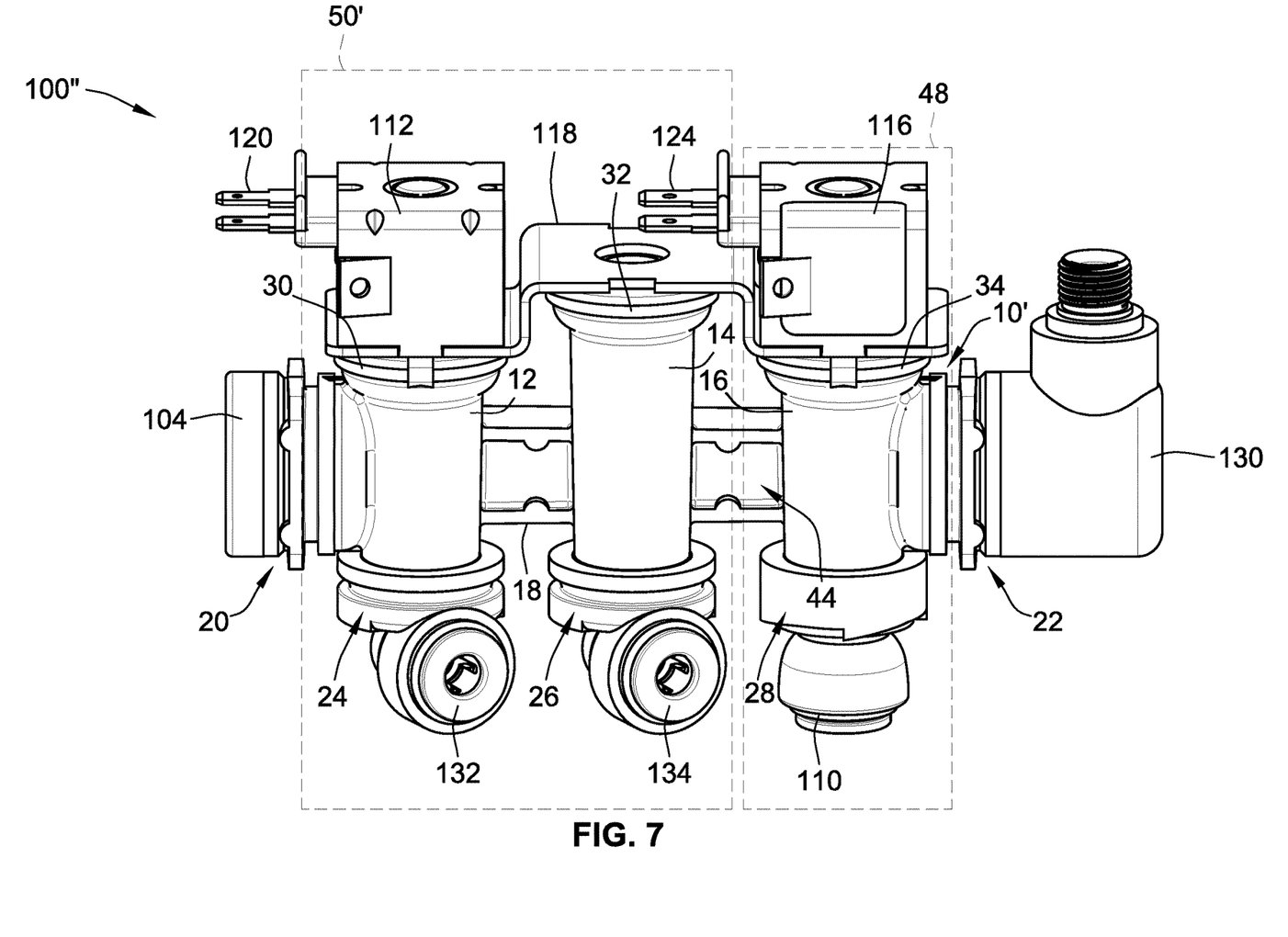
FIG. 7 depicts a third configuration of a triple valve having a discontinuous channel, according to an exemplary embodiment.

A third configuration 100" of the triple valve 10' having a center split 44 is depicted in FIG. 7. In the third configuration 100", the first end 20 of the triple valve 10' is plugged with a cap 104, while the second end 22 is provided with a threaded right angle connector 130. The third valve body 16 again operates as an isolation valve 48, but as can be seen in FIG. 7, the second valve body 14 is plugged instead of being fitted with a solenoid. Thus, the first valve body 12 and the second valve body 14 operate a single valve 50'. Because of the cap 104 at the first end 20, fluid is instead routed into the first port 24 of the first valve body 12 or the second port 26 of the second valve body 14. As depicted in the embodiment of FIG. 7, the first port 24 is fitted with a right angle connector 132, and the second port 26 is fitted with a right angle connector 134; however, other connectors are used in different embodiments.

In an exemplary embodiment, unfiltered water is supplied through a connection to the threaded right angle connector 130 to the second end 22 of the triple valve 10'. The third solenoid 116 is actuated to permit or prevent flow through the third valve body 16 to a filtration unit. The second port 26 serves as the inlet to the single valve 50' (i.e., the first valve body 12 and the second valve body 14). Because the second valve body 14 is not provided with a solenoid, the filtered water will flow through the second valve body 14 into the central core pin 18. The filtered water is then distributed through the first valve body 12 upon actuation of the first solenoid 112. For example, the filter water is routed through the first port 24 to an icemaker, a water dispenser, and/or a pitcher filler. Advantageously, the third configuration 100" provides the smallest profile and, thus, takes up the least amount of available storage space in the refrigerator.

Figure 8:
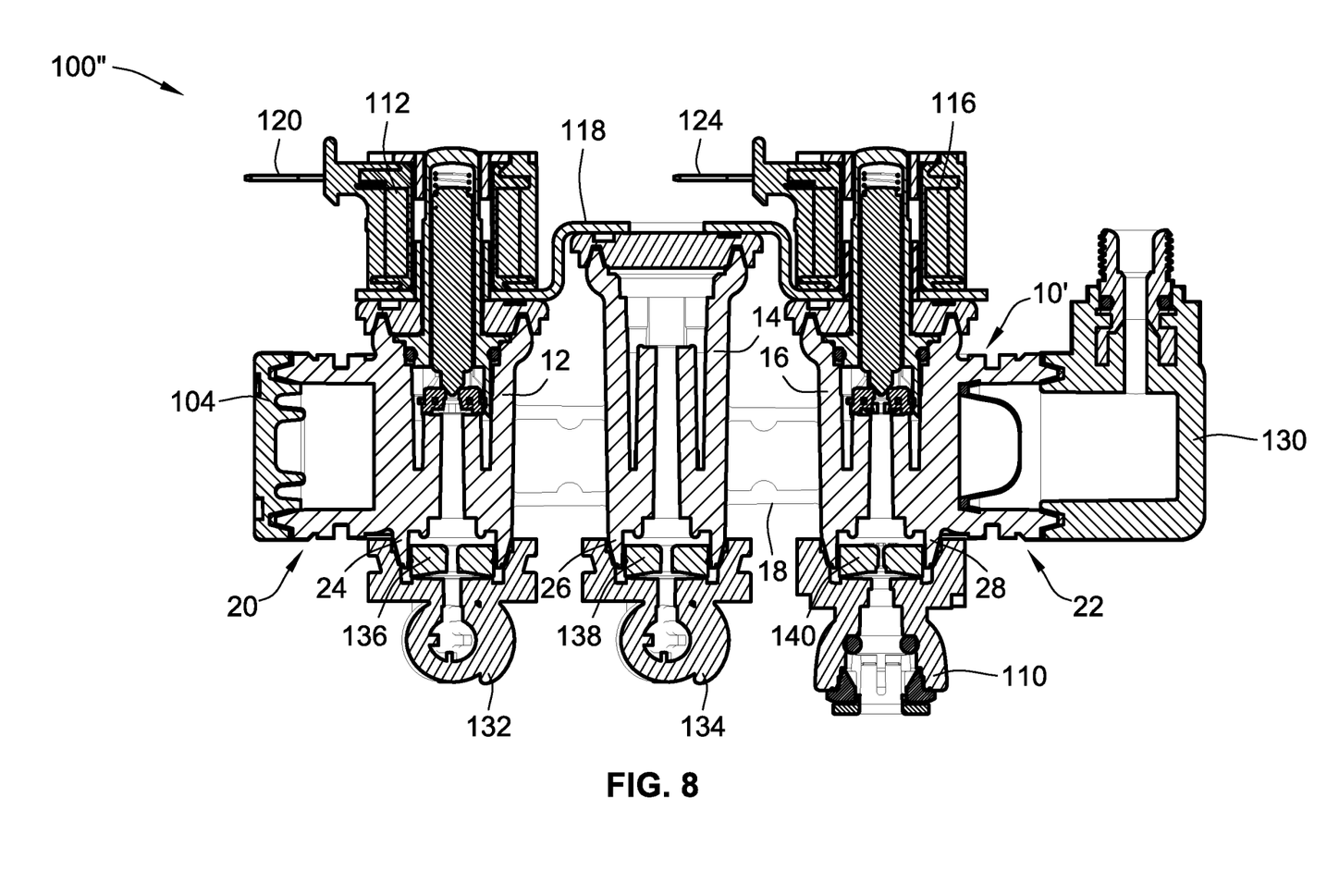
FIG. 8 depicts a cross-sectional view of FIG. 7, showing flow control washers, according to an exemplary embodiment.

Embodiments of the triple valve 10, 10' disclosed herein provide several advantages. As mentioned previously, one advantage is that the connectors (e.g., straight connectors, right angle connectors, threaded connectors, etc.) are interchangeable on the triple valve 10, 10'. Additionally, in various embodiments of the triple valve 10, 10', flow restrictions are provided in the first port 24, second port 26, and/or third port 28. For instance, as can be seen in FIG. 8, each of the first port 24, second port 26, and third port 28 are provided with flow control washers 136, 138, 140. The first port 24 and the second port 26 are provided with similarly sized flow control washers 136, 138, but the flow control washer 140 of the third port 28 has a narrower restriction, thereby limiting flow through the third port 28. In embodiments, the flow control washers 136, 138, 140 are removable and replaceable from the triple valve 10, 10' by removing the connectors 110, 132, 134 from the ports 24, 26, 28. As compared to other conventional valves, the ability to include and/or exchange flow control washers 136, 138, 140 provides enhanced customizability of the triple valve 10, 10'.

Another advantage of the triple valve 10, 10' is that the same mold can be used to create both the triple valve 10 with the single continuous central core pin channel and the triple valve 10' with the core split. In this regard, a mold is fashioned for the triple valve 10, and an insert is simply placed in the mold at the location of the core split so as to cause that region of the mold to fill in with the molding resin. In this way, only a single mold is needed to provide multiple configurations of a valve for routing fluid.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A triple valve, comprising:
   a first valve body having a first end and a second end;
   a second valve body having a first end and a second end;
   a third valve body having a first end and a second end; and
   a central core pin that mechanically connects the first valve body, the second valve body, and the third valve body;
   wherein the second valve body is disposed between the first valve body and the third valve body;
   wherein the second valve body extends beyond a plane defined by the first end of the first valve body or by the first end of the third valve body;
   wherein the central core pin defines a continuous interior channel that is in fluid communication with the first valve body, the second valve body, and the third valve body; and
   wherein each of the first valve body, the second valve body, and the third valve body comprise:
   a port at the second end;
   a central bore in fluid communication with the port; and
   a passage disposed exterior to the central bore, the passage being in fluid communication with the continuous interior channel and with the central bore.

2. The triple valve of claim 1, wherein each of the first ends of the first valve body, the second valve body, and the third valve body has a solenoid mounted thereon and wherein actuation of each respective solenoid permits or prevents fluid communication between the respective central bore and the respective passage of the first valve body, the second valve body, and the third valve body.

3. The triple valve of claim 2, wherein a first end of continuous interior channel is configured to receive fluid from a fluid supply and fluid entering the first end of the continuous interior channel is distributed through one or more of the first valve body, the second valve body, or the third valve body via actuation of the respective solenoid of the first valve body, the second valve body, or the third valve body.

4. The triple valve of claim 1, wherein the first valve body, the second valve body, and the third valve body are arranged substantially along a straight line, wherein at least two of the first valve body, the second valve body, or the third valve body has a solenoid mounted thereon, and wherein each solenoid has one or more connection prongs that are oriented substantially parallel to the straight line.

5. The triple valve of claim 4, wherein each of the first valve body, the second valve body, and the third valve body has a solenoid mounted thereon and wherein two of the solenoids are oriented in a first direction and the third solenoid is oriented in a second direction that is 180° from the first direction.

6. The triple valve of claim 1, wherein the central bore of each of the first valve body, the second valve body, and the third valve body has a first longitudinal axis and the passage of each of the first valve body, the second valve body, and the third valve body has a second longitudinal axis and wherein the first longitudinal axis is parallel to the second longitudinal axis.

7. A method of routing water within a refrigerator with the triple valve according to claim 1, wherein the first valve body further comprises a first solenoid, the second valve body comprises a second solenoid, and the third valve body comprises a third solenoid, wherein the method comprises the steps of:
- supplying water to a first end of the central core pin;
- actuating at least one of the first solenoid, the second solenoid, or the third solenoid; and
- distributing water to a feature of the refrigerator through the respective first valve body, second valve body, or third valve body of the actuated first solenoid, second solenoid, or third solenoid.

8. The method of claim 7, wherein the step of distributing water to a feature further comprises distributing water to at least one of an icemaker, a water dispenser, or a pitcher filler.

9. The method of claim 7, wherein the step of distributing water to a feature further comprises distributing water to an icemaker through one of the first valve body, the second valve body, or the third valve body upon actuating the respective first solenoid, second solenoid, or third solenoid and distributing water to a water dispenser through another of the first valve body, the second valve body, or the third valve body upon actuating the respective first solenoid, second solenoid, or third solenoid.

* * * * *